Jan. 29, 1935.  G. J. ATWELL  1,989,125
TRUCK BODY
Filed April 4, 1932  2 Sheets-Sheet 1
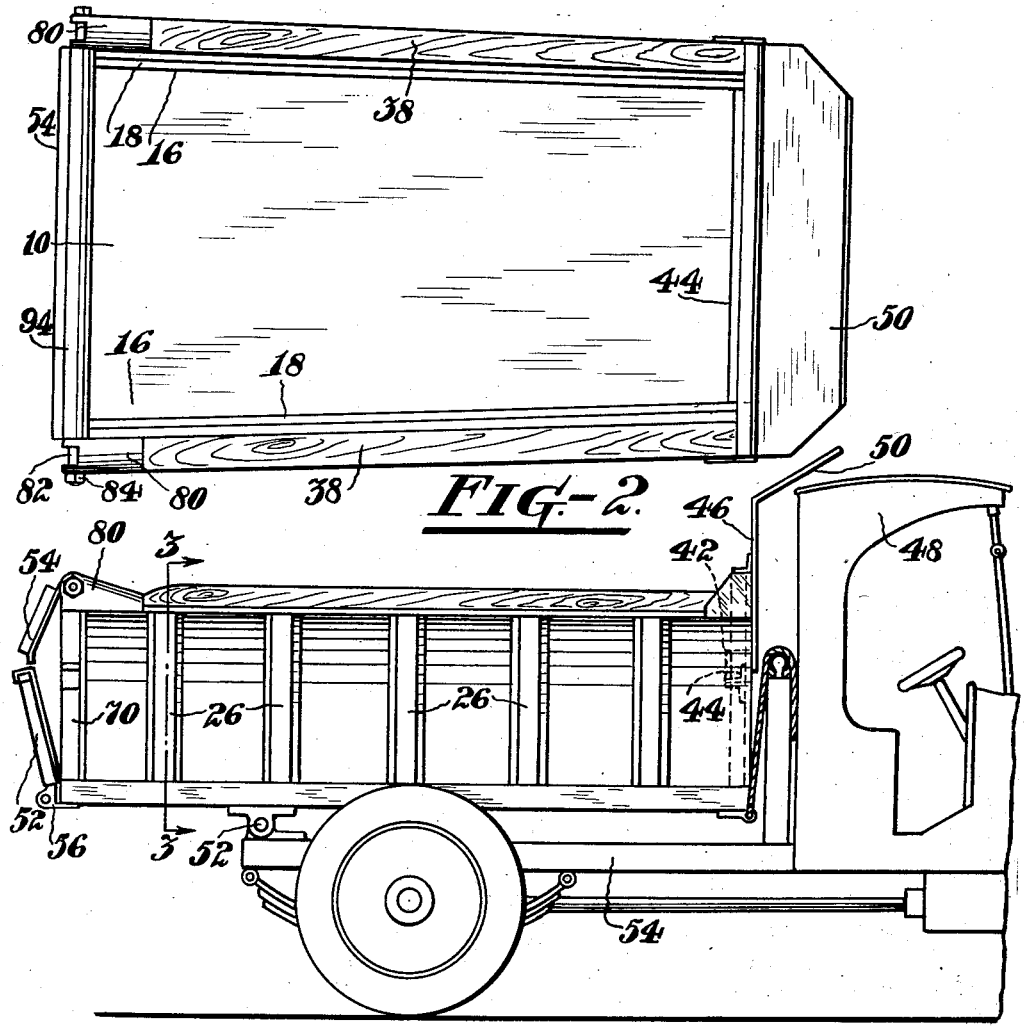
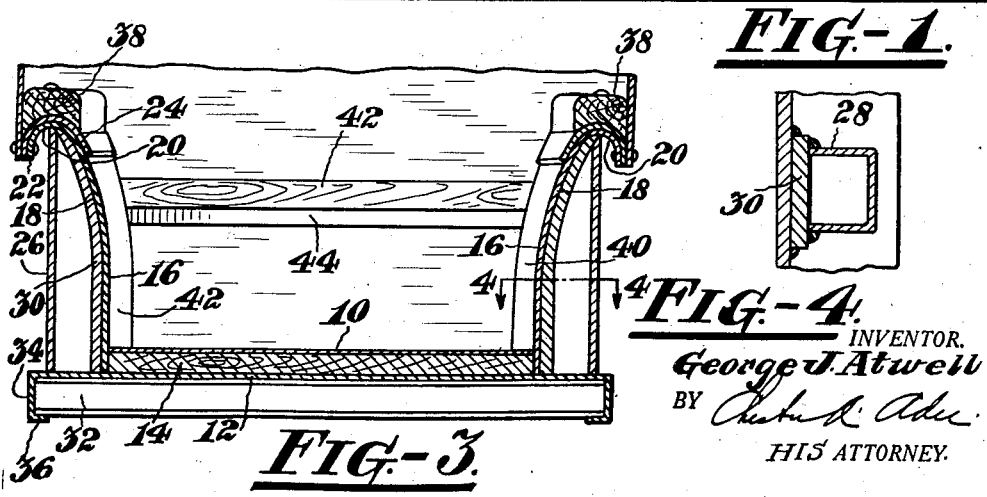
INVENTOR.
George J. Atwell
BY
HIS ATTORNEY.

Jan. 29, 1935. G. J. ATWELL 1,989,125
TRUCK BODY
Filed April 4, 1932 2 Sheets-Sheet 2
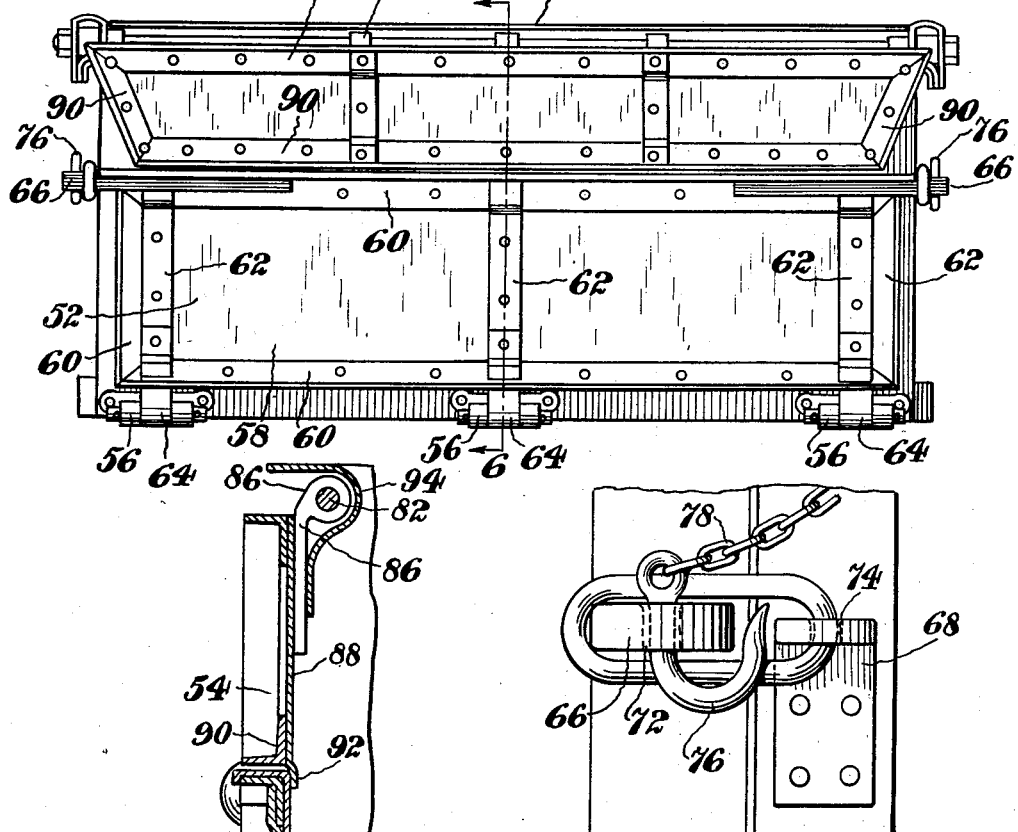
INVENTOR.
George J. Atwell.
BY
HIS ATTORNEY.

Patented Jan. 29, 1935

1,989,125

UNITED STATES PATENT OFFICE 1,989,125

TRUCK BODY

George J. Atwell, New York, N. Y.

Application April 4, 1932, Serial No. 602,962

4 Claims. (Cl. 296—28)

This invention relates to truck bodies.

The invention has for its object to provide a truck which shall have great capacity and which is sturdy, easily unloaded and protects the driver from injury while loading.

The invention and its objects and advantages will be better understood by reference to the drawings and the following description:

In the drawings Fig. 1 is a side view of a preferred form of the truck body indicating the manner in which it may be mounted on the truck chassis.

Fig. 2 is a plan view of the form of truck body shown in Fig. 1,

Fig. 3 is a cross section of the body taken along the plane 3—3 looking in the direction of the arrows, Fig. 4 is a longitudinal section through the side of the body along the plane 4—4 of Fig. 3 looking in the direction of the arrows, Fig. 5 is a rear view of the truck body, Fig. 6 is a section of the tail gate along the plane 6—6 of Fig. 5 looking in the direction of the arrows, and Fig. 7 is a detailed view of the fastening for the tail gate.

Referring to the drawings, the body has a bottom floor consisting of an upper sheet metal plate 10 and a lower plate 12 spaced from it, the spacing between these two plates being substantially filled with an interlining 14 of wood or similar material.

Upon the bottom floor are supported sides 16 which extend upwardly therefrom preferably vertical for a short distance and then curving outwardly as at 18. At the top the sides 16 are bent over with a relatively sharply curved upper edge 20 and extend downwardly with a lower lip 22. This sharp curvature gives great strength to the top of the sides and braces them both sidewise and in an up and down direction.

The upper edge 20 is further reinforced by means of a plate 24 curved to fit the sharper curvature of the sides accurately and welded in place. The sides are braced with respect to the bottom by vertical channels 26 preferably welded to the lower plate 12 of the bottom floor. Between the channels 26 and the metallic sheet sides 16 is interposed a stiffening plate 30 bent to the curvature of the sides 16 and welded fast for the purpose of giving a very rigid support to the channels 26 and prevent any buckling of the sides at this point. The channels or braces 26 extend the height of the sides 16 and the legs 28 of these channels are cut to fit substantially the curvature of the plate 30 and are welded fast to that plate.

The channels 26 are spaced apart at substantial intervals as shown in Fig. 1 and support the sides rigidly. Preferably below the bottom plate 12 and the channels 26 are provided suitable I-beams 32 which are supported from the lower plate 12 by downwardly extending ends 34 of the plate 12 which hook below the I-beams 32 as at 36. These I-beams 32 are preferably welded in place to give a maximum of rigidity.

The arrangement of sides with their bracing and the bottom floor gives a maximum of rigidity to the construction to prevent spreading of the sides 16 when subjected to heavy loads. On the upper edge of the sides 16 are mounted wooden rails 38 which overlie the uppermost surfaces of the sides 16 and are either riveted or bolted fast so that they may be easily replaced when worn out.

At the front end of the body is provided a head plate 40 preferably welded to the front end of the sides 16 and reinforced at the corners with suitable angles 42. Horizontally across the head plate 40 is positioned a wooden brace 42 which extends from one side 16 to the other and is supported by angles 44 suitably attached to the head plate. Extending upwardly from the head plate 40 is provided a cab guard 46 approximately to the level of the top of the driver's cab 48 and thence forwardly and partly over the top of the cab as shown at 50.

The body is especially designed for heavy loads of either rock or loose material, such as dirt, and is particularly adapted to be used as a dump body. For this purpose it is hinged as at 52 upon the frame 54 of the truck chassis. When being used with damp material which packs tightly in the truck, dump bodies are troubled with sticking of the material to the truck so that they do not dump easily. To avoid this difficulty this invention provides the sides 16 diverging with respect to each other toward the rear of the truck as shown in Fig. 2. With the least starting of the load when the body is in dumping position the entire contents of the body will slide out at the minimum of resistance on the sides 16, there being no obstructing braces within the body.

At the rear of the truck is provided a tail gate in two sections 52 and 54. The lower section 52 is preferably hinged upon brackets 56 at the bottom floor of the body and consists of a rectangular plate 58 with vertically extending side edges so as to overlap for a considerable distance the sides 16. No spreading of the sides 16 can therefore form a crack between the lower section 52 of the tail gate and the rearmost edges of the sides 16. The margins of the tail gate 52 are preferably provided with reinforcing angles 60 to provide rigidity. The plate 58 is also reinforced by the straps 62 and the hinges 64 passing through the lower angles 60.

The lower section 52 of the tail gate is held closed preferably by the device shown in Figs. 5 and 7 which includes laterally extending bars 66 suitably attached to the upper angle 60 and extending therebeyond to a position adjacent brackets 68 mounted on the rearmost side braces 70 of the sides 16. The bars 66 and the brackets 68 are provided with holes 72 and 74 respectively. In the hole 74 is provided a link which is adapted to loop over the bar 66 beyond the hole 72 and permit a curved pin 76 to be inserted into the hole to prevent accidental removal of the link 66. The pin 76 is preferably provided with a chain 78 for permanent attachment to the body.

At the rear end of the body and at the top of the sides 16 are provided brackets 80 on either side of the body which are adapted to receive a hinge bolt 82 threaded at at least one end and provided with a nut 84. This bolt when in place and screwed up acts as a tie between the two sides 16 to prevent spreading. It functions furthermore as a hinge-pin for the upper section 54 of the tail gate which is provided with hinges 86 through which the bolt passes.

The upper section 54 of the tail gate is formed of a plate 88 edged with angles 90 for stiffness. The plate 88 at its lower edge extends beyond the lower angle 90 and is bent slightly backwardly as at 92 to be engaged by the lower section of the gate 52, as shown in Fig. 6. Thus when the both sections of the gate are in the closed position the lower section 52 holds the upper section 54 closed. The bolt 82 is relatively long and in order to protect it from damage a guard plate 94 is provided suitably attached to the plate 88, the hinges 86 and spaced from the latter. The plate 94 is bent to pass up about the bolt 82 and to the rear forming a guard or protection against falling rock and the like. Being protected in this way the bolt 82 never can be bent and is easily removable.

The truck herein described is for very heavy duty and is especially adapted for use in connection with steam shovels and loading of huge pieces of rock from excavations and the like. Previously, truck bodies for this use have had a very short life, being not sufficiently protected structurally because of inherent weaknesses. Pieces of rock often weighing more than a ton are dropped into these trucks from which it may be seen that great sturdiness is required. These rocks are jagged and when landing on edge, as for instance on the sides or the bottom of the truck, can easily do great damage.

The flooring of the truck above described is adapted to withstand shocks, being protected from wear by the sheet metal upper plate 10 and from the shock by the wooden interlining 14 which supports the upper plate 10.

The sides 16 are very rigid due to the curvature 20 of the upper edge and the wooden rails preferably of oak at 38. In this case the rails 38 receive the impact from the dropping material and while they will wear out comparatively quickly, they are easily and cheaply replaced. Furthermore, the cab is protected both from the bursting in of the front plate 40 which is reinforced by the wooden bar or brace 42 also replaceable, and by the cab guard 46, 50, which, while it may be bent, will break the force of the material dropping toward the cab.

Thus by the above construction are accomplished, among others, the objects and advantages hereinbefore referred to.

I claim:

1. A truck body having a bottom floor and sides extending upwardly therefrom and diverging with respect to each other toward the rear of the body, said sides being of sheet metal, a metal plate overlying the sides and being secured thereto and having a wooden rail mounted upon and overlying the top surfaces thereof.

2. A truck body having a bottom floor and sheet metal sides extending upwardly therefrom terminating in a curved upper edge, a curved plate overlying the upper edge and being secured to the sides, and a wooden rail overlying the curved plate.

3. A truck body having a double sheet metal bottom floor and a cushioning interlining in said floor, sheet metal sides extending upwardly therefrom and being welded to the lowermost sheet of the floor, a reinforcing plate overlying the top of the sides and being secured to the sides, and a wooden rail overlying the reinforcing plate.

4. A truck body having a bottom floor and sheet metal sides extending upwardly therefrom partly vertical and partly curving outwardly and terminating at the top in a curved upper edge, a sheet metal head plate extending from the bottom floor vertically and being secured to the front ends of sheet metal sides, a brace for said head plate extending from one metal side to another, and a cab guard attached to said head plate extending vertically above the sides and having a portion extending forwardly with respect to the body.

GEORGE J. ATWELL.